Figure 1:
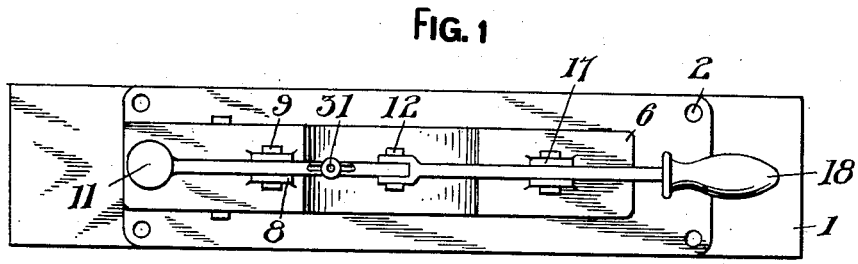

J. STUGNER.
NUTCRACKER.
APPLICATION FILED MAR. 14, 1912.

1,033,487.

Patented July 23, 1912.

WITNESSES
J. P. Hoffman,
Ralph C. Evert.

INVENTOR
JOHN STUGNER
BY N. C. Evert & Co.
ATTORNEYS

COLUMBIA PLANOGRAPH CO., WASHINGTON, D. C.

UNITED STATES PATENT OFFICE.

JOHN STUGNER, OF McKEES ROCKS, PENNSYLVANIA.

NUTCRACKER.

1,033,487.  Specification of Letters Patent.  Patented July 23, 1912.

Application filed March 14, 1912. Serial No. 683,824.

*To all whom it may concern:*

Be it known that I, JOHN STUGNER, a subject of the King of Hungary, residing at McKees Rocks, in the county of Allegheny and State of Pennsylvania, have invented certain new and useful Improvements in Nutcrackers, of which the following is a specification, reference being had therein to the accompanying drawing.

This invention relates to a nut cracker, and the object of my invention is to provide a simple and inexpensive nut cracking device that can be advantageously used in hotels and restaurants for cracking large quantities of nuts, the device being constructed whereby a nut can be given a heavy blow sufficient to crack the shell thereof, and as the nut cracking device recedes the cracked nut is ejected.

I attain the above objects by a mechanical construction that is strong and durable and highly efficient for the purposes for which it is intended.

The invention will be hereinafter specifically described and then claimed, and reference will now be had to the drawing, wherein—

Figure 2:
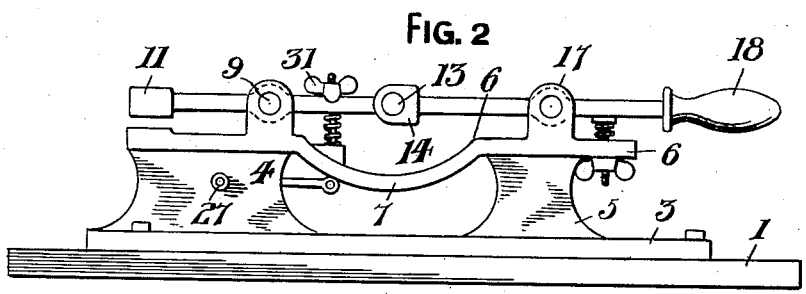
Figure 3:
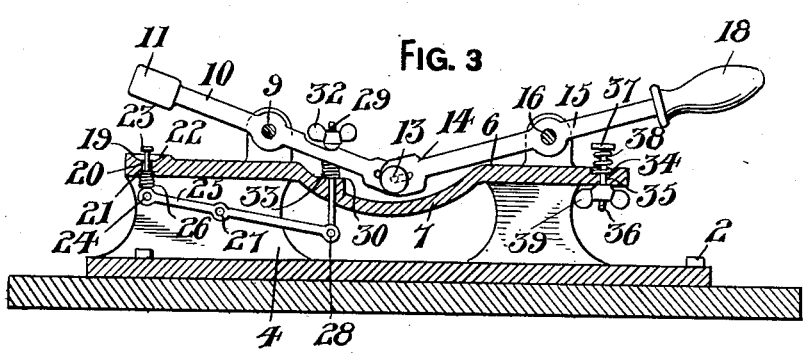
Figure 4:
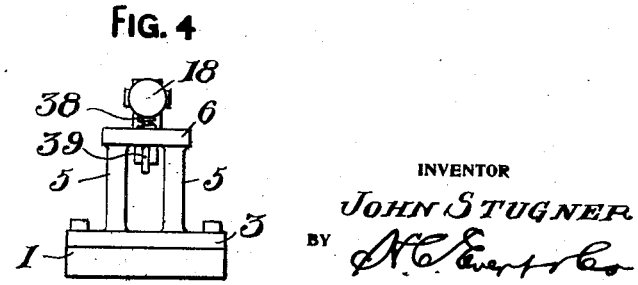

Figure 1 is a plan of the nut cracking device, Fig. 2 is a side elevation of the same, Fig. 3 is a longitudinal sectional view of the device, and Fig. 4 is a view of the rear end of the device.

The reference numeral 1 denotes a suitable support, as a table top and secured to said support by nails 2 or other fastening means is a rectangular base 3 having forward side walls 4 and rear side walls 5, said walls supporting a horizontal plate 6 having a central depressed portion 7.

The plate 6 at the forward edge of the depression 7 is provided with vertical apertured lugs 8 and pivotally mounted between these lugs by a pin 9 is a striking arm 10. This arm has the forward end thereof provided with a head 11 and the rear end with a slotted enlargement 12. Pivotally connected to the slotted enlargement 12 by a pin 13 is the forward enlarged slotted end 14 of an apertured lever 15, said lever being pivotally mounted upon a pin 16, carried by vertical apertured lugs 17 adjacent to the rear end of the plate 6. The rear end of the operating lever 15 has a suitable handle 18.

The forward end of the plate 6 beneath the head 11 of the striking arm 10 is provided with a recess 19 and a vertical opening 20 centrally of said recess, the lower end of the opening 20 being enlarged to provide a socket 21. Extending upwardly through the socket 21 is a pin 22 having the upper end thereof provided with a flat head 23 and the lower end with an apertured head, which is pivotally connected by a pin 24 to the forward end of an ejector arm 25. Encircling the pin 22 is a coiled spring 26 having the upper convolution thereof engaging in the socket 21.

The ejector arm 25 is pivotally mounted upon a pin 27 arranged transversely of the walls 4. Pivotally connected to the rear end of the arm 25 by a pin 28 is a vertical rod 29 extending upwardly through an apertured boss 30, carried by the depressed portion 7 of the plate 6. The rod 30 extends through a longitudinal slot 31 provided therefor in the rear end of the striking arm 10, and said rod is screw threaded to receive a winged thumb nut 32. Encircling the rod 29 between the boss 30 and the lower side of the arm 10 is a coiled compression spring 33.

The rear end of the plate 6 beneath the rear end of the operating lever 15 has a socket 34 and a vertical opening 35 centrally of said socket. Arranged in the opening 35 is a pin 36 having the upper end thereof provided with a head 37. Encircling the pin 36 between the plate 6 and the head 37 is a coiled spring 38, said spring having the lower convolution thereof engaging in the socket 34. Detachably mounted upon the lower end of the pin 36 is a winged thumb nut 39 adapted to prevent accidental displacement of the pin 36 and the spring 38.

When the handle 18 of the lever 15 is slightly lowered, the pin 22 will be lowered to allow a nut to rest in the recess 19 beneath the head 11. When the handle 18 is completely lowered, the head 11 of the striking arm 10 will engage the nut and crack the shell thereof, the lowering movement of the operating lever being limited and cushioned by the spring supported pin 36. When the handle 18 is released, the spring supported pin 36 immediately restores the lever 15 to its normal position, and the ejector arm 35 is actuated through the medium of the rod 29 to elevate the pin 22 and remove the cracked nut from the recess 19.

The device in its entirety can be made of light and durable metal and of various sizes.

What I claim is:—

A nut cracker comprising a base, spaced upright supports carried by the forward end of the base, spaced upright supports carried by the rear of the base, a plate mounted upon said supports and having a centrally depressed portion, front and rear lugs carried by said plate, a striking arm pivotally supported by the front lugs, an operating lever pivotally supported by the rear lugs, means for pivotally connecting the lever to said striking arm, means carried by the rear portion of the plate for cushioning the movement of the handle end of said lever, an ejector arm pivotally connected between the forward supports below said plate, a spring controlled ejecting element extending through said plate and actuated by said ejector arm, and a spring controlled rod connected to said ejector arm and operated by said striking arm.

In testimony whereof I affix my signature in the presence of two witnesses.

JOHN STUGNER.

Witnesses:
 CHRISTINA T. HOOD,
 MAX H. SROLOVITZ.

Copies of this patent may be obtained for five cents each, by addressing the "Commissioner of Patents, Washington, D. C."